US009219563B2

(12) United States Patent
Smadi et al.

(10) Patent No.: US 9,219,563 B2
(45) Date of Patent: Dec. 22, 2015

(54) METHOD AND SYSTEM FOR ADDRESSING INTERFERENCE BETWEEN CO-EXISTING RADIOS OF DIFFERING RADIO ACCESS TECHNOLOGIES

(71) Applicant: Research In Motion Limited, Waterloo (CA)

(72) Inventors: Mohammed Nawaf Smadi, Waterloo (CA); Cristian Lambiri, Ottawa (CA); Michael Hubo-Kleiss, Bochum (DE)

(73) Assignee: BlackBerry Limited, Waterloo, Ontario (CA)

( * ) Notice: Subject to any disclaimer, the term of this patent is extended or adjusted under 35 U.S.C. 154(b) by 521 days.

(21) Appl. No.: 13/625,411

(22) Filed: Sep. 24, 2012

(65) Prior Publication Data
US 2014/0087785 A1 Mar. 27, 2014

(51) Int. Cl.
*H04J 11/00* (2006.01)
(52) U.S. Cl.
CPC .................................. *H04J 11/0023* (2013.01)
(58) Field of Classification Search
CPC .................................................... G06F 11/004
USPC .............. 455/42.1, 436, 552.1; 370/331, 329, 370/252
See application file for complete search history.

(56) References Cited

U.S. PATENT DOCUMENTS

| 2010/0304685 | A1 | 12/2010 | Wietfeldt et al. |
| 2011/0205986 | A1 | 8/2011 | Medapalli |
| 2011/0243047 | A1 | 10/2011 | Dayal et al. |
| 2012/0034913 | A1* | 2/2012 | Wang et al. ................ 455/426.1 |
| 2012/0040620 | A1 | 2/2012 | Fu et al. |
| 2012/0075989 | A1 | 3/2012 | Roessel et al. |
| 2012/0082140 | A1 | 4/2012 | Lin et al. |
| 2012/0155298 | A1 | 6/2012 | Yang et al. |
| 2012/0155303 | A1 | 6/2012 | Kuo |
| 2012/0155437 | A1 | 6/2012 | Kuo |

(Continued)

FOREIGN PATENT DOCUMENTS

| WO | 2012044328 A1 | 4/2012 |
| WO | 2012093349 A2 | 7/2012 |
| WO | 2012096949 A1 | 7/2012 |

OTHER PUBLICATIONS

Sudhir Kumar Baghel, et al.; "Coexistence Possibilities of LTE with ISM Technologies and GNSS", 2011 National Conference on Communications, Jan. 28-30, 2011, Samsung India Software Oper. Pvt. Ltd., Bangalore, India, pp. 1-5.

(Continued)

*Primary Examiner* — Brandon Miller
*Assistant Examiner* — Joseph Dean, Jr.
(74) *Attorney, Agent, or Firm* — Fish & Richardson P.C.

(57) ABSTRACT

Methods and systems for addressing interference between co-existing radios of differing radio access technologies (RATs) are provided. One RAT radio send an indication to a second RAT radio when it is transmitting, but does so after determining there is an actual likelihood that the first RAT transmission will interfere with reception by the second RAT radio. Optionally, the second RAT radio makes its own determination of whether there is a likelihood of interference, and ignores the indication if it is determined interference is not likely. Alternatively, the second RAT radio sends an indication to the first RAT radio when it is receiving, only after determining there is a likelihood that first RAT transmissions will interfere with reception by the second RAT radio.

20 Claims, 6 Drawing Sheets

(56) References Cited

U.S. PATENT DOCUMENTS

| | | | |
|---|---|---|---|
| 2012/0163307 A1 | 6/2012 | Wang et al. | |
| 2012/0163312 A1 | 6/2012 | Xhafa et al. | |
| 2012/0164948 A1 | 6/2012 | Narasimha et al. | |
| 2012/0170557 A1 | 7/2012 | Tsfati et al. | |
| 2012/0182896 A1 | 7/2012 | Jang et al. | |
| 2012/0213116 A1* | 8/2012 | Koo et al. | 370/253 |
| 2012/0327869 A1* | 12/2012 | Wang et al. | 370/329 |
| 2013/0155884 A1* | 6/2013 | Wang et al. | 370/252 |
| 2013/0225149 A1* | 8/2013 | Sadek et al. | 455/418 |

OTHER PUBLICATIONS

3GPP Standard, "3rd Generation Partnership Project; Technical Specification Group Radio Access Network; Evolved Universal Terrestrial Radio Access (E-UTRA); Study on signalling and procedure for interference avoicance for in-device coexistence (Release 11)", ; 3GPP TR 36.816, 3rd Generation Partnership Project (3GPP), Mobile Competence Centre; 650, Route Des Lucioles; F-06921 Sophia-Antipolis Cedex; France, vol. RAN WG2, No. V11.2.0, Dec. 22, 2011, pp. 1-44, XP050555147.

Motorola Mobility: "Triggering of In-device Coexistence Procedures", 3GPP Draft; R2-115370-Triggering of Indevice Coexistence Procedures, 3rd Generation Partnership Project (3GPP), Mobile Competence Centre; 650, Route Des Lucioles; F-06921 Sophia-Antipolis Cedex; France, vol. RAN WG2, no. Zhuhai; 20111010, Oct. 4, 2011, pp. 1-3, XP050541044.

Office Action issued in Canadian Application No. 2,827,088 on Mar. 19, 2015; 5 pages (45635-CA-PAT).

* cited by examiner

METHOD AND SYSTEM FOR ADDRESSING INTERFERENCE BETWEEN CO-EXISTING RADIOS OF DIFFERING RADIO ACCESS TECHNOLOGIES

FIELD

The application relates to methods and systems for addressing interference between co-existing radios of differing radio access technologies.

BACKGROUND

Current wireless devices often have a set of co-existing radios that include a respective radio for each of several radio access technologies. For example, a wireless device may have an LTE (Long Term Evolution) radio and a Wi-Fi radio. The transmissions of one such co-existing radio can interfere with receptions by the other co-existing radio. Additionally, the concurrent transmission of two or more radios may result in interference with the reception of a co-located radio.

BRIEF DESCRIPTION OF THE DRAWINGS

Embodiments of the disclosure will now be described with reference to the attached drawings in which.

DETAILED DESCRIPTION

According to one aspect of the present application, there is provided a method in a device comprising a first RAT (radio access technology) radio and a second RAT radio, the method comprising: determining whether or not a transmission from the first RAT radio is expected to cause interference to reception by the second RAT radio based on at least one interference criterion; transmitting an indication from the first RAT radio to the second RAT radio to indicate that the first RAT radio is transmitting only when it has been determined that the transmission from the first RAT radio is expected to cause interference to reception by the second RAT radio.

According to another aspect of the present application, there is provided a method in a device comprising a first RAT radio and a second RAT radio, the method comprising: determining whether or not a transmission from the first RAT is expected to cause interference to reception by the second RAT radio based on at least one interference criterion; transmitting an indication from the second RAT radio to the first RAT radio to indicate that the second RAT radio is receiving only when it has been determined that the transmission from the first RAT radio is expected to cause interference to reception by the second RAT radio.

According to yet another aspect of the present application, there is provided a method in a device comprising a first RAT radio and a second RAT radio, the method comprising: the second RAT radio receiving an indication from the first RAT radio indicating that the first RAT radio is transmitting; the second RAT radio determining whether or not a transmission from the first RAT radio is expected to cause interference to the second RAT radio based on at least one interference criterion; if it is determined that the transmission from the first RAT radio is not expected to cause interference to the second RAT radio, ignoring the indication.

According to a further aspect of the present application, there is provided a communications device comprising: a first RAT (radio access technology) radio; a second RAT radio, the method comprising: a first interference determiner that determines whether or not a transmission from the first RAT radio is expected to cause interference to reception by the second RAT radio based on at least one interference criterion; wherein the first RAT radio is configured to transmitting an indication from the first RAT radio to the second RAT radio to indicate that the first RAT radio is transmitting only when it has been determined that the transmission from the first RAT radio is expected to cause interference to reception by the second RAT radio.

According to yet a further aspect of the present application, there is provided a communications device comprising: a first RAT (radio access technology) radio; a second RAT radio, the method comprising: an interference determiner that determines whether or not a transmission from the first RAT is expected to cause interference to reception by the second RAT radio based on at least one interference criterion; wherein the second RAT radio is configured to transmit an indication from the second RAT radio to the first RAT radio to indicate that the second RAT radio is receiving only when it has been determined that the transmission from the first RAT radio is expected to cause interference to reception by the second RAT radio.

According to still a further aspect of the present application, there is provided a communications device comprising: a first RAT (radio access technology) radio; a second RAT radio: the first RAT radio configured to send an indication to the second RAT radio indicating that the first RAT radio is transmitting; the second RAT radio comprising an interference determiner that determines whether or not a transmission from the first RAT radio is expected to cause interference to the second RAT radio based on at least one interference criterion; wherein if it is determined that the transmission from the first RAT radio is not expected to cause interference to the second RAT radio, the second RAT radio ignores the indication sent by the first RAT radio.

According to another aspect of the present application, there is provided a non-transitory computer readable medium having computer executable instructions stored thereon that when executed cause a device comprising a first RAT (radio access technology) radio and a second RAT radio to implement a method, the method comprising: determining whether or not a transmission from the first RAT radio is expected to cause interference to reception by the second RAT radio based on at least one interference criterion; transmitting an indication from the first RAT radio to the second RAT radio to indicate that the first RAT radio is transmitting only when it has been determined that the transmission from the first RAT radio is expected to cause interference to reception by the second RAT radio.

According to yet another aspect of the present application, there is provided a non-transitory computer readable medium having computer executable instructions stored thereon that when executed cause a device comprising a first RAT (radio access technology) radio and a second RAT radio to implement a method, the method comprising: determining whether or not a transmission from the first RAT is expected to cause interference to reception by the second RAT radio based on at least one interference criterion; transmitting an indication from the second RAT radio to the first RAT radio to indicate that the second RAT radio is receiving only when it has been determined that the transmission from the first RAT radio is expected to cause interference to reception by the second RAT radio.

According to still a further aspect of the present application, there is provided a non-transitory computer readable medium having computer executable instructions stored thereon that when executed cause a device comprising a first RAT (radio access technology) radio and a second RAT radio to implement a method, the method comprising: the second RAT radio receiving an indication from the first RAT radio indicating that the first RAT radio is transmitting; the second RAT radio determining whether or not a transmission from the first RAT radio is expected to cause interference to the second RAT radio based on at least one interference criterion; if it is determined that the transmission from the first RAT radio is not expected to cause interference to the second RAT radio, ignoring the indication.

In a specific example of interference due to co-existing radios, LTE transmissions in LTE bands B7, B38, B40 and B41 may interfere with a co-existing Wi-Fi radio receiver operating in the ISM (Industrial Scientific and Medical) band. Such transmissions may additionally, or alternatively interfere with a co-existing Bluetooth (BT) radio receiver.

In the absence of interference, there is a minimum required receiver signal strength (RSS) for Wi-Fi reception satisfying expected receiver sensitivity. In the presence of interference from a co-existing radio, this minimum RSS increases; the amount of increase is referred to as de-sense.

The extent of the Wi-Fi receiver de-sense is dependent on the LTE output power, number of resource blocks (RBs) allocated by the base station (eNB), the antenna isolation between the two radios, and the coexistence filters used.

Figure 1:
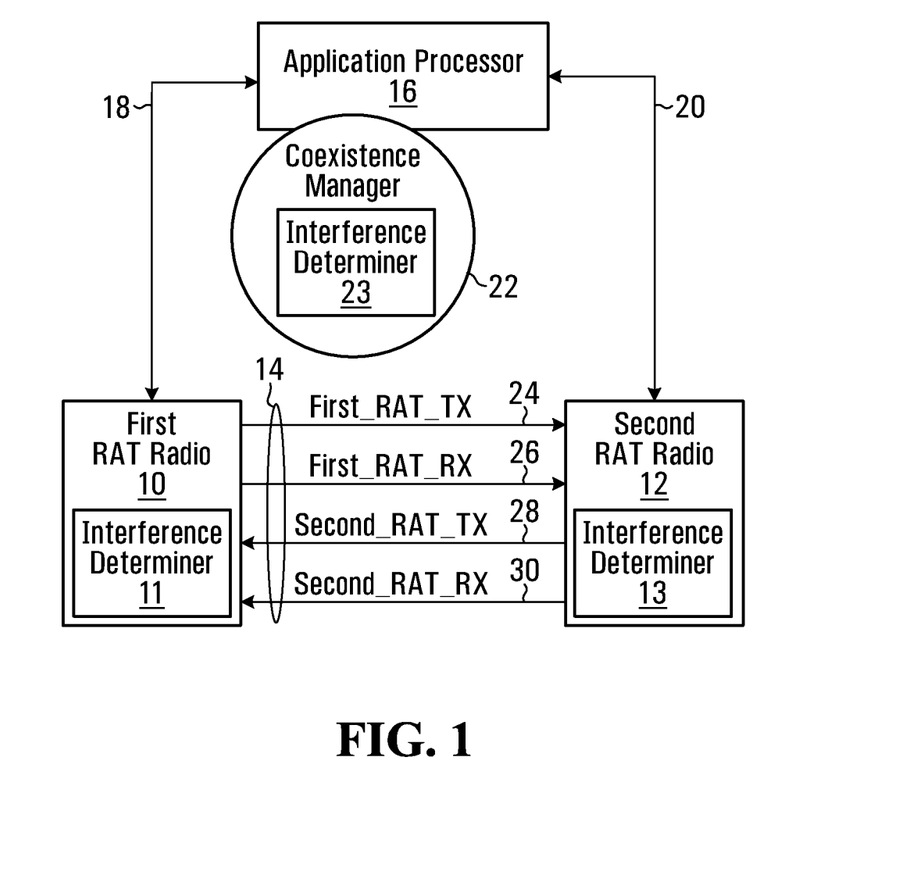
FIG. 1 is a block diagram of a communications device featuring two radios for coexisting radio access technologies.

FIG. 1 shows a communications device having co-existing first RAT (radio access technology) radio 10, which may for example be an LTE radio and second RAT radio 12 which may, for example, be a Wi-Fi, a BT radio or a GPS radio; more generally, there may be one or more second RAT radios. The first RAT radio 10 and the second RAT radio 12 are connected over a real-time communications channel 14. In some embodiments, the real-time communications channel is a GPIO (General Purpose Input/Output) bus.

In some embodiments, the communications device also includes an application processor 16. The first RAT radio 10 communicates with the application processor 16 over a first RAT radio interface 18, and the second RAT radio 12 communicates with the application processor over a second RAT radio interface 20. The application processor 16 includes a coexistence manager 22 responsible for managing the coexistence of the first RAT radio 10 and the second RAT radio 12. However, in other embodiments, the two radios 10,12 manage the coexistence without the involvement of an application processor or coexistence manager.

Also shown is an interference determiner 11 forming part of the first RAT radio 10, an interference determiner 13 forming part of the second RAT radio 12, and an interference determiner 23 forming part of coexistence manager 22. More generally, the device has at least one interference determiner. Each interference determiner makes a determination of whether transmissions from one RAT radio are expected to interfere with reception by the other RAT radio, as a function of at least one interference criteria. Many specific examples are provided below. More specifically, each interference may determine one or both of:

whether transmissions from the first RAT radio are expected to interfere with reception by the second RAT radio;

whether transmissions from the second RAT radio are expected to interfere with reception by the first RAT radio.

The first RAT radio 10 transmits a signal first_RAT_TX 24 for certain first RAT transmissions. The second RAT radio 12 transmits a signal second_RAT_TX 28 for certain second RAT transmissions. The first RAT radio 10 transmits a signal first_RAT_RX 26 to indicate to the second RAT radio 12 that second RAT radio transmissions may interfere with first RAT radio reception. The second RAT radio 12 transmits a signal second_RAT_RX 30 to indicate to the first RAT radio 10 that first RAT radio transmissions may interfere with second RAT radio reception. The names of signals 24,26,28,30 the names of all other signals and variables/parameters referred herein are by way of example only. In the description that follows, it is assumed that all four of these signals 24,26,28,30 are implemented; associated functionality for all four signals is described. However, more generally, it is contemplated that a set of one or more of signals 24,26,28,30 may be implemented. Specifically, in some embodiments, one of signals 24,26,28,20 is implemented. In some embodiments, two of signals 24,26,28,20 are implemented. In some embodiments, three of signals 24,26,28,20 are implemented. In some embodiments, all four of signals 24,26,28,20 are implemented. Signals 24,26,28,30 can be viewed as logical signals. They can be transmitted on four wires, or multiplexed on a smaller number of wires or on some other physical interconnection. For example, two of the signals described above can be carried over one physical wire with a coexistence manager letting the two radios know when the meaning changes.

The signal first_RAT_TX from the first RAT radio 10 to the second RAT radio 12 is only transmitted when actual interference to the second RAT radio 12 due to transmissions of the first RAT radio is expected, as defined by at least one interference criterion.

The signal second_RAT_TX from the second RAT radio 12 to the first RAT radio 10 is only transmitted when actual interference to the first RAT radio 10 due to transmissions of the second RAT radio is expected, as defined by at least one interference criterion.

The signal first_RAT_RX from the first RAT radio 10 to the second RAT radio 10 is only transmitted when the first RAT radio expects that transmissions of the second RAT radio 12 may interfere with reception at the first RAT radio, as defined by at least one interference criterion. For example, the first_RAT_Rx signal may be raised if the received signal at the first RAT radio 10 is weak enough to the point where any transmission by the first RAT radio is expected to cause interference with the reception at the first RAT radio 10. In some embodiments, this determination is made a priori by third entity for example coexistence manager 22 and sent to the one or both radios. In an alternate embodiment the determination could be made by the second RAT radio based on additional logic or inference process such as monitoring its signal to interference and noise ratio while taking into account first RAT radio activity.

The signal second_RAT_RX from the second RAT radio 12 to the first RAT radio 10 is only transmitted when the second RAT radio expects that transmissions of the first RAT radio 10 may interfere with reception at the second RAT radio, as defined by at least one interference criterion.

The same or different interference criterion may be used to decide whether to transmit each of the four signals. The interference criterion can be provided to the first RAT radio 10 and the second RAT radio 12 using any suitable technique. To name a few specific examples, the criterion can be configured directly on the first RAT radio 10 and second RAT radio 12, stored in non-volatile memory accessible or forming part of the first RAT radio 10 or the second RAT radio 12, or provided to the first RAT radio 10 by the coexistence manager 22 via the first RAT radio interface 18, and to the second RAT radio 12 by the coexistence manager 22 via the second RAT radio interface 20.

The following are three specific examples of interference criteria:

1) an interference criterion is based on output power.

2) an interference criterion is based on a measure of bandwidth of the signal being output. A specific example of a measure of bandwidth applicable in LTE systems is the number of LTE resource blocks being transmitted;

3) an interference criterion is based on a frequency separation between a first RAT frequency band and a second RAT second RAT frequency band.

In some embodiments, one of the three criteria listed above are employed. In some embodiments, two of the criteria listed above are employed. Finally, in some embodiments, all three of the criteria listed above are employed.

In an example that involves the use of one of the criteria listed above, at least one interference criterion for transmission of first_RAT_TX includes that the first RAT output power is greater than a certain threshold. The first RAT output power may be calculated by the radio ahead of the transmission.

In some embodiments, the threshold is determined offline. The following is a specific example of a method of determining the threshold offline.

i) Determine a certain tolerable second RAT de-sense value (i.e. below which the second RAT operation is considered satisfactory). Example value may be 3 dB.

ii) Using a lab setup, for the closest first RAT and second RAT channels (i.e. smallest frequency separation) find the first RAT output power that results in exceeding the determined tolerable second RAT de-sense value.

Alternatively, the threshold is determined during actual operation of the radios 10,12. The following is a specific example of a method of determining the threshold during actual operation of the radios.

i) The second RAT radio transmits an indicator to the first RAT radio to indicate to the first RAT radio that it is being de-sensed. This determination may be made, for example, by examining performance metrics such as frame error rate (FER).

ii) The first RAT radio makes a record of the first RAT radio output value at which this indicator is asserted by the second RAT radio. Every time this indicator is asserted the current value of the threshold used to decide whether or not to transmit first_RAT_TX is compared to the current first RAT radio output power. If the current first RAT radio output power<threshold, then the threshold is updated with the current first RAT radio output power.

iii) The most updated threshold is used for asserting first_RAT_TX.

In an example that involves the use of two of the criteria introduced above, at least one interference criterion for the transmission of first_RAT_TX is a function of the first RAT output power, and a measure of bandwidth of the signal being output by the first RAT radio 10. In the example that follows where one of the RAT is LTE, it is assumed that the measure of bandwidth is the number of resource blocks, but other measures may be used. In LTE; a resource block effectively is the minimal unit of bandwidth allocation and is the equivalent of 180 KHz.

In a specific example, the first_RAT_TX indicator is asserted if the combination of the first RAT output power and the number of resource blocks transmitted is expected to cause the acceptable de-sense value to be exceeded. A list of these pairs may be defined either offline or during actual use of the radios in a manner similar to that described above. Specifically, i) The second RAT radio transmits an indicator to the first RAT radio to indicate to the first RAT radio that it is being de-sensed.

ii) The first RAT radio records the first RAT radio output value and number of resource blocks being transmitted at which this indicator is asserted by the second RAT radio. A current transmit power threshold is maintained for each number of resource blocks (or for ranges of resource blocks). Every time this indicator is asserted the current value of the threshold for the current number of resource blocks is compared to the current first RAT radio output power. If the current first RAT radio output power<threshold, then the threshold for the current number of resource blocks is updated with the current first RAT radio output power.

iii) The most updated threshold is used for asserting first_RAT_TX for the current number of resource blocks.

In an example that involves the use of all three interference criteria introduced above, the at least one interference criterion is a function of the first RAT output power, the number of resource blocks being transmitted, and frequency separation between a first RAT frequency band and second RAT frequency band.

In a specific example, the first_RAT_TX indicator is asserted if the combination of first RAT output power, number of resource blocks and frequency separation is expected to cause the acceptable de-sense value to be exceeded. A list of these triplets may be defined either offline or in a similar manner to that described above.

All of the above description is equally applicable to interference criteria for the transmission of second_RAT_TX, where the interference criteria are instead applied to signals transmitted by the second RAT radio.

All of the above description is equally applicable to interference criteria for the transmission of first RAT_RX and second_RAT_RX, where the interference criteria are instead applied to signals received by the first RAT radio and the second RAT radio respectively.

Receiver Implemented Methods

In the above described embodiment, it is the transmitter that decides whether or not to transmit first_RAT_TX or second_RAT_TX as a function of at least one interference criterion. In another embodiment, the signal first_RAT_TX is transmitted whenever the first RAT radio is transmitting (additionally or alternatively the signal second_RAT_TX is transmitted whenever the second RAT radio is transmitting). Then it is up to the receiver of the signal first_RAT_TX or second_RAT_TX to decide on a course of action based on an expected de-sense.

In a specific example, first_RAT_TX is asserted by an LTE radio for every LTE transmission and the second RAT radio, for example, a Wi-Fi radio unilaterally decides its course of action based on the expected de-sense. In some embodiments, the Wi-Fi radio has a carrier sense mechanism (with dynamic threshold) that is employed during concurrent Wi-Fi idle and LTE transmit periods to estimate the Wi-Fi de-sense due to LTE interference. This method assumes that the LTE output power and number of resource blocks do not change faster than the interval between Wi-Fi de-sense estimate updates. Other methods may be employed to do this estimation.

This receiver implemented approach can be combined with other embodiments described herein. In a specific example, a first RAT radio sends first_RAT_TX when interference to the second RAT radio reception is expected; the second RAT radio that receives the first_RAT_TX can still make its own determination of whether interference is expected, and unilaterally ignore the first_RAT_TX if it concludes no interference is likely. This can be useful if the second RAT radio has the ability to make a more meaningful assessment of whether interference is likely.

Area of Interference

Figure 2A:
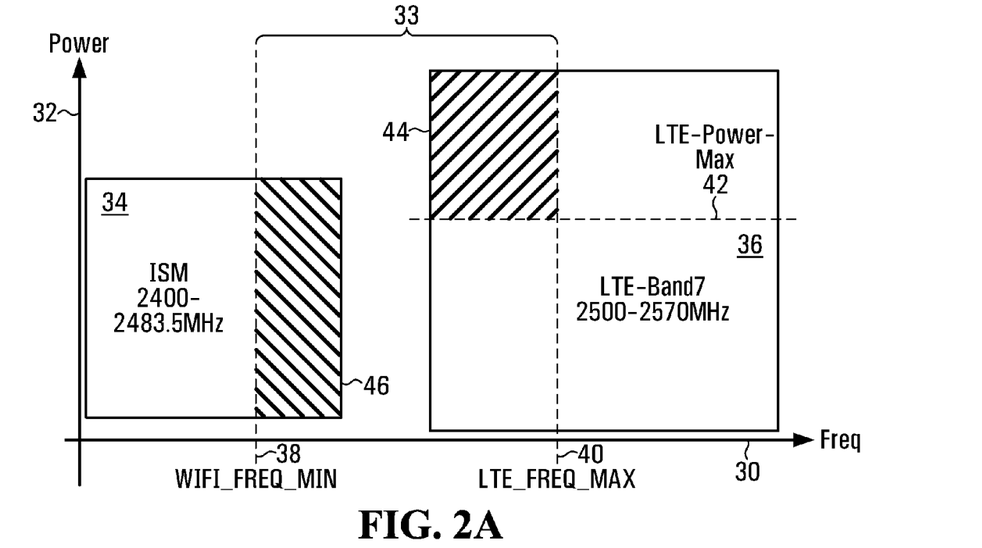
FIGS. 2A and 2B are schematic depictions of definitions of regions of interference.
Figure 2B:
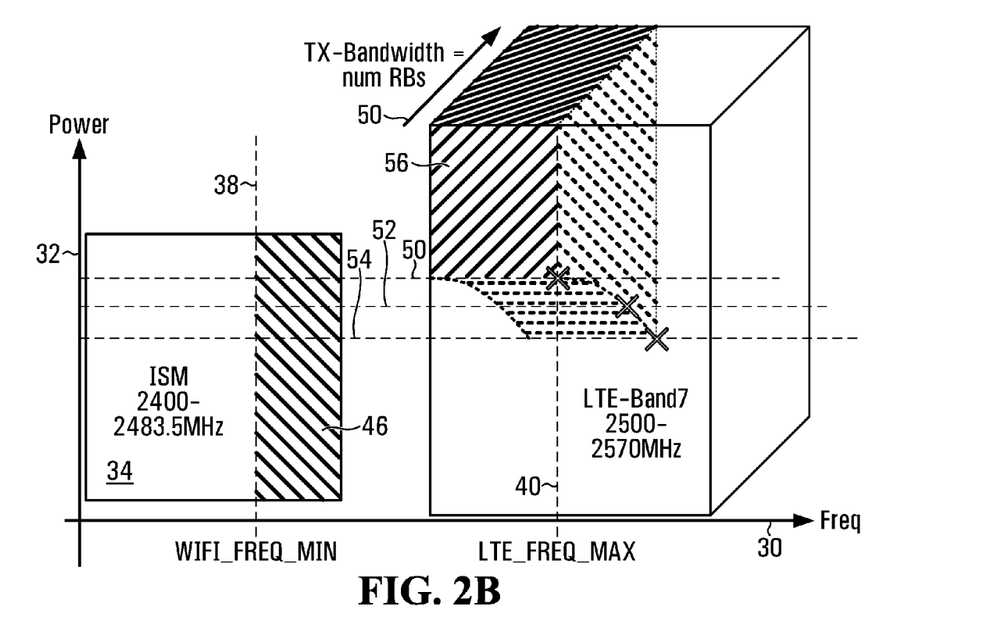

FIGS. 2A and 2B depict two example definitions of an area of interference that may be used for embodiments described herein. This description, and associated variable names, assumes that the first radio RAT is LTE, that the band of interest is LTE Band7, and the second RAT radio is Wi-Fi, but it should be understood that the variable names are for example only, and the description applies to other LTE bands, and to other RAT co-existence contexts.

Referring now to FIG. 2A The horizontal axis 30 represents frequency. Shown are two thresholds Wi-Fi_FREQ_MIN 38 and LTE_FREQ_MAX 40 that define a frequency range 33 of potential interference. The vertical axis 32 represents transmit power. Shown is a threshold LTE-Power-Max 42.

The range of operation for LTE Band7 is indicated at 34; this includes a range of frequencies in the frequency axis, and a range of transmit powers in the power axis. The particular frequency range for this example is 2500 to 2570 MHz. LTE Band7 transmission operates using a channel in this frequency range.

The range of operation for ISM is indicated at 36; this includes a range of frequencies in the frequency axis, and a range of transmit powers in the power axis. The particular frequency range for this example is 2400 to 2483.5 MHz. ISM operates transmission and reception using a 22 MHz channel in this frequency range.

From the LTE perspective, potential interference may occur due to LTE transmissions when the channel frequency for LTE is below the threshold LTE_FREQ_MAX and the LTE transmit power is above LTE-Power-Max. This is depicted as hatched area 44. When operating outside of area 44, LTE does not generate First_RAT_TX based on the understanding that there will be no interference, and as such, no benefit to transmitting First_RAT_TX.

From the Wi-Fi perspective, potential interference due to LTE transmissions may occur when the channel frequency for ISM is above the threshold Wi-Fi_FREQ_MIN. This is depicted as hatched area 46. When operating outside of area 46 Wi-Fi can ignore First_RAT_TX.

In some embodiments, a signal is sent from the second RAT radio to the first RAT radio (for example from Wi-Fi to LTE) that is a request for prioritized transmission. This signal is referred to herein as PRIOR_REQ. This is a specific example of second_RAT_RX.

In some embodiments, from the LTE perspective when operating outside of area 44, it can safely ignore PRIOR_REQ. From the Wi-Fi perspective, it can refrain from generating PRIOR_REQ while operating outside of hatched area 46.

Referring now to FIG. 2B, shown is another example definition of an area of interference which is based on the example of FIG. 2A, and uses the same reference numbers where appropriate, but which also includes a third axis 50 that represents transmit bandwidth, for example as defined by number of resource blocks. Shown are three thresholds 50, 52, 54. Threshold 50 is a maximum LTE transmit power for a first transmit bandwidth (or number of resource blocks). Threshold 52 is a maximum LTE transmit power for a second transmit bandwidth (or number of resource blocks). Threshold 54 is a maximum LTE transmit power for a third transmit bandwidth (or number of resource blocks). More generally, it can be seen that a transmit power threshold is defined that is a function of the transmit bandwidth; an example of such a function is depicted as curve 56. This function can be referred to as LTE-Power-Max (transmit bandwidth).

From the LTE perspective, potential interference may occur when the channel frequency for LTE is below the threshold LTE_FREQ_MAX and the LTE transmit power is above LTE-Power-Max (transmit bandwidth). This is depicted as hatched volume 56. When operating outside of volume 56, LTE does not generate First_RAT_TX based on the understanding that there will be no interference, and as such, no benefit to transmitting First_RAT_TX.

From the Wi-Fi perspective, potential interference may occur when the channel frequency for ISM is above the threshold Wi-Fi_FREQ_MIN. This is depicted as hatched area 46. When operating outside of area 46 Wi-Fi can ignore First_RAT_TX.

In embodiments that employ the use of PRIOR_REQ, from the LTE perspective when operating outside of volume 56, it can safely ignore PRIOR_REQ. From the Wi-Fi perspective, it can refrain from generating PRIOR_REQ while operating outside of hatched area 46.

Figure 3:
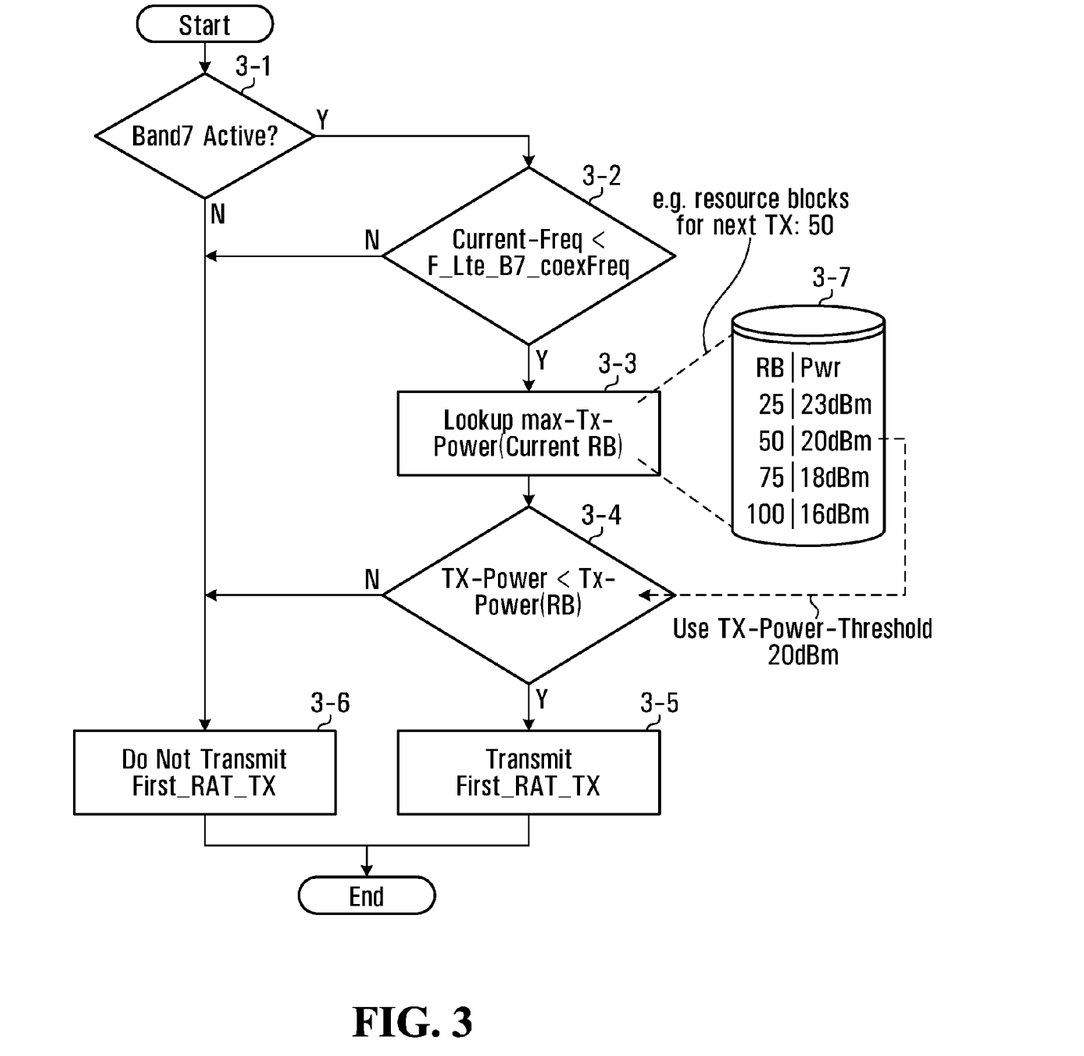
FIG. 3 is a flowchart of a method of transmitting an indication that the first RAT radio is transmitting.

FIG. 3 is a flowchart of an example method of first_RAT_TX signal generation from LTE perspective. In block 3-1, a determination of whether Band7 is active. More generally, a determination of whether a band of interest is active may be performed. Alternatively, in some embodiments, this block is omitted in which case the method begins at block 3-2.

In block 3-2, the current frequency Current_Freq is compared to a threshold F_LTE_B7_coexFreq to determine if it is less than the threshold. The threshold F_LTE_B7_coexFreq is a function of the Wi-Fi channel. If not, no path, then no First_RAT_TX is generated at 3-6. If it is less than the threshold, then the power threshold for the current transmit bandwidth (number of resource blocks) is determined at block 3-3. For example, as depicted in the illustrated example, this information may be stored in a memory 3-7. The specific values, and manner of storing them are for the purpose of example only. For this particular scenario, the number of resource blocks for the next transmission is 50, which has a corresponding threshold of 20 dBm. In block 3-4 if the transmit power is less than the threshold, then no first_RAT_TX is generated at block 3-6. If the transmit power is greater than or equal to the threshold, then first_RAT_TX is generated at block 3-5.

In some embodiments, a multi-wire interface between the RAT two radios is used to convey the signaling. For example, logic level signaling over a GPIO may be employed. The following is a specific example configuration of such logic level signaling for LTE and BT coexistence, or LTE and Wi-Fi coexistence. In the following "BT/Wi-Fi" is short hand for BT or Wi-Fi. However, the approach can be applied to BT or Wi-Fi or both; where it is applied for both, a separate instance of the configuration can be applied for each of BT and Wi-Fi, and separate signals can be employed for each of BT and Wi-Fi. Similar parameters may be defined for other pairs of coexisting RATs.

First_RAT_TX (LTE→BT/Wi-Fi):

A HIGH level on this signal indicates that LTE TX activity is ongoing.

This signal may, for example, be used by the BT/Wi-Fi chip to take special considerations on failed RX decoding during these periods (e.g. remove from rate adaptation algorithm) The LTE radio only generates the signal under the following conditions:
Band7 active
AND Tx-Power>P_Lte_B7_coex_thres
AND Num assigned ResourceBlocks>Num_LTE_B7_RB_thres
AND Current TX Freq<F_Lte_B7_coex_freq.

In some embodiments, the threshold P_Lte_B7_coex_thres referred to above may be a function of other parameters such as frequency and/or the number of resource blocks. This threshold value may, for example, be obtained via lookup in a table using: 1) an index of frequency and returning the threshold number value as in FIG. 2A OR 2) an index of the # of RB and frequency and returning the threshold number value as in FIG. 2B.

Since the first_RAT_TX is ONLY active when interference is expected, there is no need for a separate notification of the BT/Wi-Fi chip that LTE is operating in affected frequency range
PRIOR_REQ(BT/Wi-Fi→LTE):

A HIGH level on this signal indicates that BT/Wi-Fi needs the air interface for reception of a high priority packet (e.g. BT voice via SCO).

The response to this is implementation specific. In a specific example, when this signal is set active the LTE-Stack reduces the LTE-Tx-Power to a level below Pmax_LTE_B7_coex if following condition is true:
Band7 is active
AND Tx-Power>P_Lte_B7_coex_thres
AND Current TX Freq<F_Lte_B7_coexFreq In some embodiments, the threshold P_Lte_B7_coex_thres referred to above may be a function of other parameters such as frequency and/or the number of resource blocks. This threshold value may, for example, be obtained via lookup in a table using: 1) an index of frequency and returning the threshold number value as in FIG. 2A OR 2) an index of the # of RB and frequency and returning the threshold number value as in FIG. 2B In case the PRIOR_REQ goes active during an ongoing LTE-TX, then the power reduction is applied to the next transmit slot and remains active until PRIOR_REQ becomes inactive.

In some embodiments, the BT/Wi-Fi chip only sets the PRIOR_REQ for a maximum duration of PRIO_T_MAX which is a maximum duty cycle for the Wi-Fi to ask for the air interface. It is stored in a location accessible by the BT/Wi-Fi chip and may be related to guaranteeing a certain level of service on the Wi-Fi radio.

In some embodiments, PRIOR_REQ must not be set active more than PRIO_FREQ_MAX, where PRIO_FREQ_MAX is a max form frequency that PRIOR_REQ can be asserted.

Figure 4:
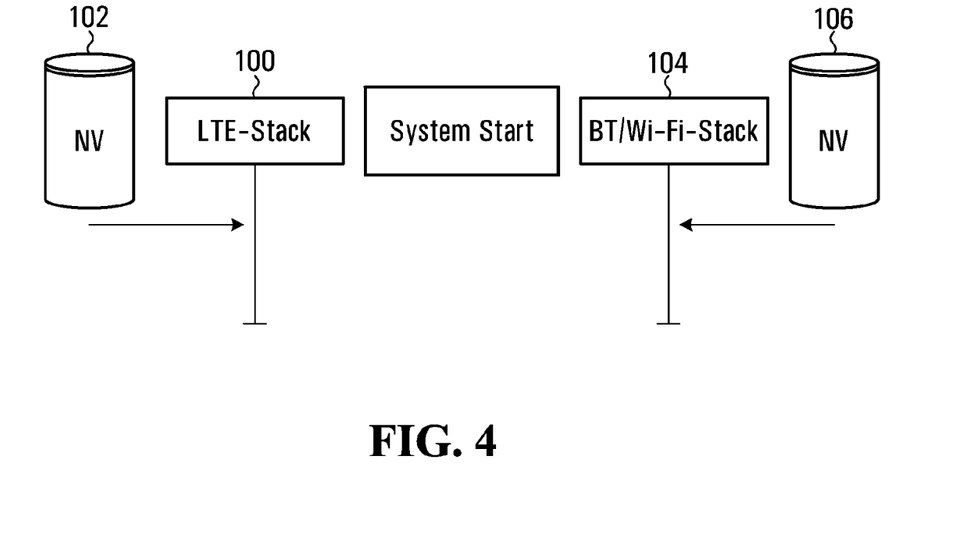
FIG. 4 is a block diagram of a communications device showing the LTE stack and BT/Wi-Fi stack.

In some embodiments, the BT/Wi-Fi_Chip only sets this signal active if it is operating on a freq >BT/Wi-Fi_Freq_min. FIG. 4 depicts a specific embodiment in which various configuration values that define the interference criteria are stored in non-volatile memory. While described in an LTE, BT/Wi-Fi context, it is applicable more generally to devices with coexisting RATs. Shown is an LTE-stack 100 (forming part of an LTE radio, not shown) that has access to non-volatile memory 102. Also shown is BT/Wi-Fi stack 104 (forming part of a BT/Wi-Fi radio, not shown) that has access to non-volatile memory 106. To enable the generator of each signal to decide if active signal state is allowed/needed, the configuration values are provided to each stack at system start from non-volatile memory. In some embodiments, during the runtime there will be no messaging interaction between the stacks, and signaling is achieved through the use of hardware signals, for example realized via GPIOs The following is a set of example items that may be passed to the LTE-Stack:
P_Lte_B7_coex_thres [Value Range 0 . . . 24 dBm, 1 dB resolution]:

Power [dBm] above which interference with BT/Wi-Fi is assumed. This can, for example, be characterized by platform/product teams and saved in a static configuration (e.g. in non-volatile memory (NV)), to be passed to the LTE-Stack on startup
F_Lte_B7_coexfreq [EARFCN 20750 . . . 21449, resolution 1]:

Frequency [EARFCN] below which interference with BT/Wi-Fi is assumed.

This may, for example, be characterized in combination with TX Power and saved in a static configuration (e.g. NV), to be passed to LTE-Stack on startup
Num_LTE_B7_RB_thres [0 . . . 100, resolution 1 RB]:

Number of allocated resource blocks above which it is assumed there will be interference with BT/Wi-Fi. This may, for example, be characterized in combination with TX Power and saved in a static configuration (e.g. NV), to be passed to LTE-Stack on startup
Pmax_LTE_B7_coex [Value Range 0 . . . 24 dBm, 1 dB resolution]:

Power level [dBm] to which LTE Stack limits its average transmit power of the next TX-Slot while the BT/Wi-Fi_PRIO_REQ is active. This may, for example, be characterized by platform/product teams and saved in static configuration (e.g. NV), to be passed to LTE-Stack on startup.

The following is a set of example items that may be passed to the BT/Wi-Fi-Stack:
Wi-Fi_Freq_min [Channel Number 1.13, resolution 1]:
Wi-Fi-Channel above which interference with LTE is assumed, so usage of the BT/Wi-Fi_PRIO_REQ signal is permitted. This may, for example, be characterized by platform/product teams and saved in static configuration (e.g. NV) to be passed to the BT/Wi-Fi-Stack on startup.
BT_Freq_min [Channel Number 0 . . . 78, resolution 1]:
BT-Channel above which interference with LTE is assumed, so usage of the
BT/Wi-Fi_PRIO_REQ signal is permitted. This may, for example, be characterized by platform/product teams and saved in static configuration (e.g. NV) to be passed to the BT/Wi-Fi-Stack on startup.
PRIO_T_MAX [0 . . . 2 ms, resolution 1 us]

Maximum time [us] the BT/Wi-Fi chip is allowed to raise the priority signal for processing high priority RX. This may, for example, be characterized by platform/product teams and saved in static configuration (e.g. NV) to be passed to the BT/Wi-Fi-Stack on startup.
PRIO_FREQ_MAX [0 . . . 50, resolution 1 (Hz)]

Maximum number of times/sec the BT/Wi-Fi chip is allowed to request priority.

Figure 5:
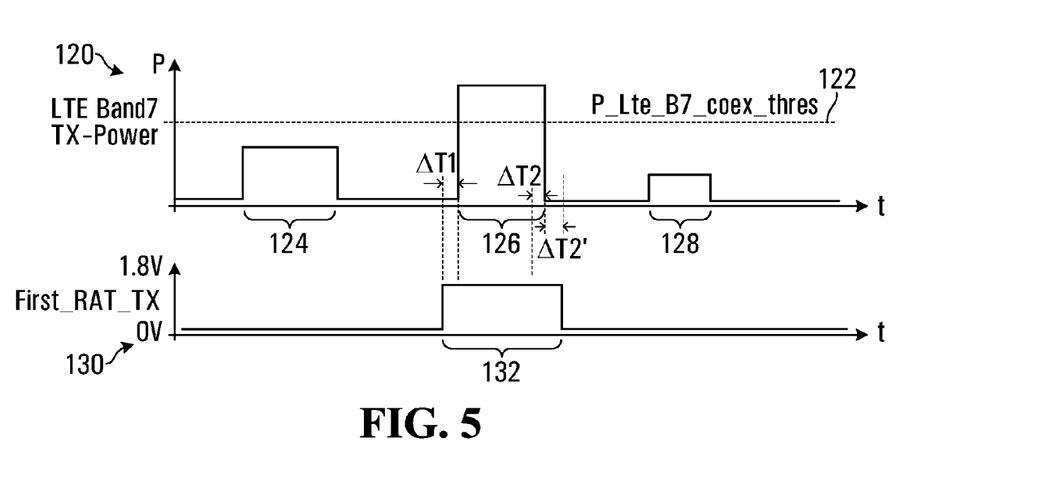
FIGS. 5 and 6 are timing diagrams for the transmission of an indication that the first RAT radio is transmitting, and an indication that the second RAT radio is receiving, respectively.
Figure 6:
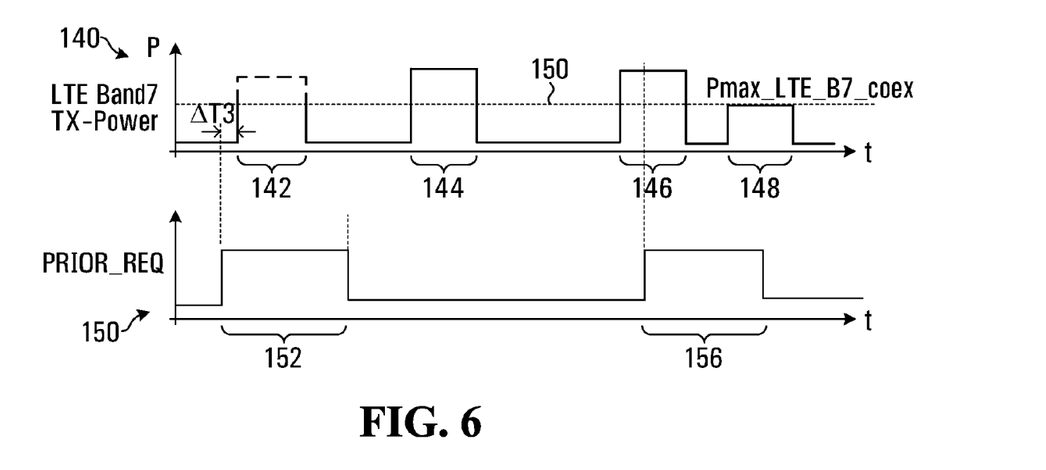

This is used to limit the number of interrupts of LTE transmission. This may, for example, be characterized by platform/product teams and saved in static configuration (e.g. NV) to be passed to the BT/Wi-Fi-Stack on startup FIG. 5 shows an example of the timing of LTE transmissions, and the generation of First_RAT_TX. An example of LTE transmissions is depicted at 120. The threshold for generating First_RAT_TX is indicated as P_LTE_B7_coex_thres 122. During time intervals 124,128, LTE transmits with a power less than this threshold. During time interval 126, LTE transmits with a power that exceeds this threshold. Corresponding First_RAT_TX signaling is indicated at 130. The signal is active during time interval 132 which corresponds with time interval 126 during which LTE transmits with a power that exceeds the threshold. The timing of the transmission of First_RAT_TX can be defined, for example based on latency requirements. In FIG. 6, $\Delta T1$ is the time between rising edge of First_RAT_TX and rising of TX-Power. $\Delta T2'$ is the time between drop of TX-Power and lowering of First_RAT_TX signal. Alternatively, LTE_B7_TX signal can be lowered before the drop of TX power as depicted in FIG. 5 by $\Delta T2$.

FIG. 6 shows an example of the timing of LTE transmissions, and the generation of PRIOR_REQ. An example of LTE transmissions is depicted at 140. The power to which LTE is limited while PRIOR_REQ is active is indicated at 150 as Pmax_LTE_B7_coex; this can equivalently be viewed as a threshold for ignoring PRIOR_REQ. PRIOR_REQ transmissions are indicated at 150; this signal is active during periods 152,156. During period 152, LTE limits its average power during the next transmit slot, during time period 142. During time period 144, PRIOR_REQ is not active and as such LTE can be transmitted at a power that exceeds the threshold. During period 146, PRIOR_REQ becomes active after the start of the transmission. LTE ignores the signal for the current active time slot, but limits transmit power to the threshold for the next slot if PRIOR_REQ is still active. In FIG. 6, $\Delta T3$ is a measure of how much in advance of an LTE transmission that PRIOR_REQ needs to be asserted for it to have an effect on the transmit power. Ideally $\Delta T3$ is zero, however it is an implementation dependent value as a function of how the LTE radio can react to this signal.

Figure 7:
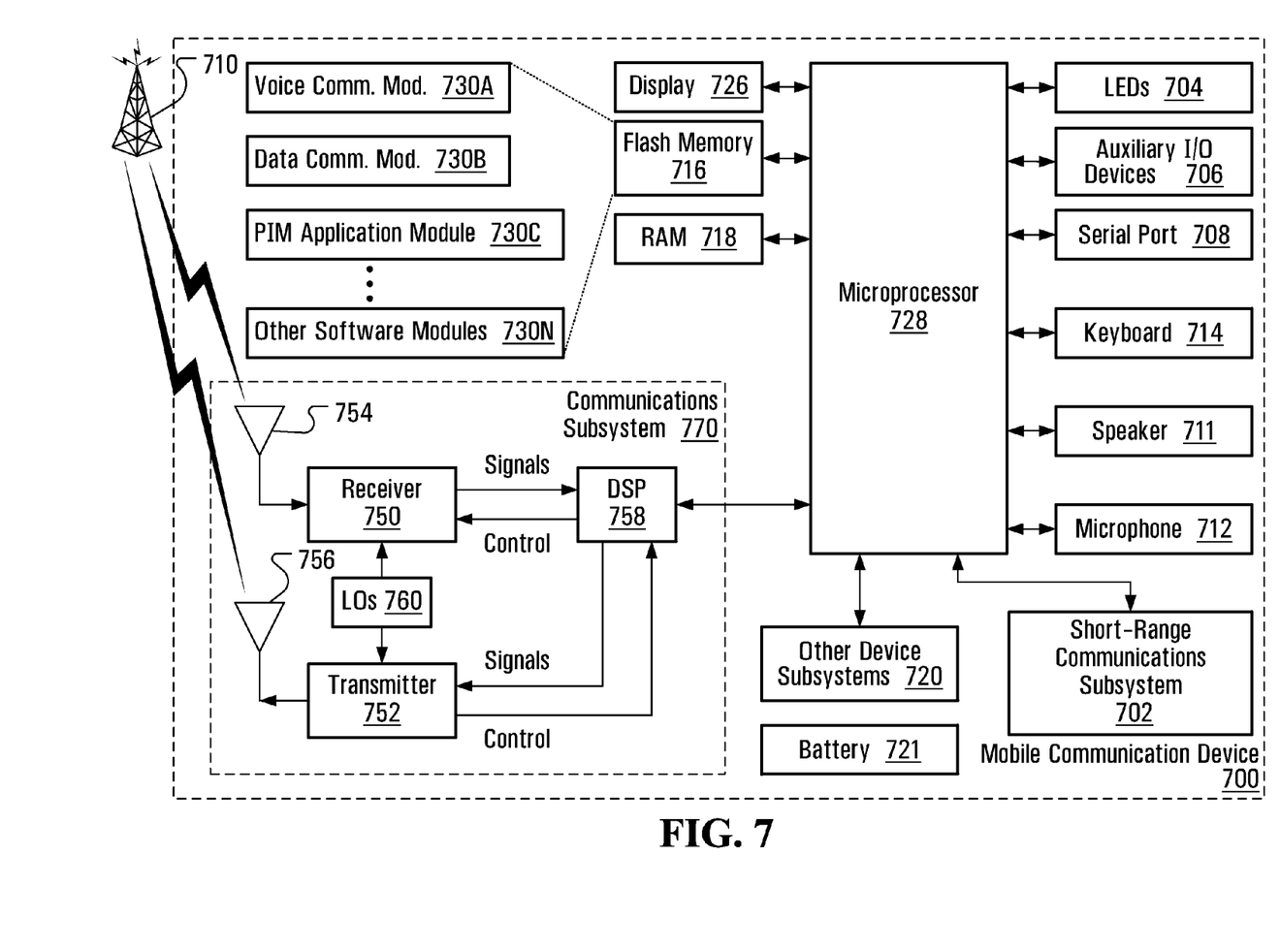
FIG. 7 is a block diagram of another mobile communications device.

Referring now to FIG. 7, shown is a block diagram of a mobile communication device 700 that may implement the methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDs 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. In some embodiments, one or more parameters representative of unevenness in the signal constellation are stored in the non-volatile memory or in a volatile store. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless communications network 710 with the device user's corresponding data items stored or associated with a host computer system. As well, additional software modules, illustrated as other software module 730N, may be installed during manufacture.

Communication functions, including data and voice communications, are performed through the communications subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communications subsystem 770 also includes a processing module, such as a digital signal processor (DSP) 758, and local oscillators (LOs) 760. The specific design and implementation of the communications subsystem 770 is dependent upon the communication network in which the mobile device 700 is intended to operate. For example, the communications subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700. The particular devices under consideration here may be multi-mode mobile devices, and as such they may include hardware and/or software for implementing at least two radio access technologies (RAT). More specifically, in a particular example, there would be a respective communications subsystem 770 for each RAT implemented by the device.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the wireless communication network 710. Signals received from the wireless communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the wireless communication network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communications subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem 702 may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practiced otherwise than as specifically described herein.

We claim:

1. A method in a device comprising a first RAT (radio access technology) radio and a second RAT radio, the method comprising:

determining whether or not a transmission from the first RAT radio is expected to cause interference to reception by the second RAT radio based on at least one interference criterion;

when it has been determined that the transmission from the first RAT radio is expected to cause interference to reception by the second RAT radio, transmitting an indication from the first RAT radio to the second RAT radio to indicate that the first RAT radio is transmitting;

if the second RAT radio is operating on a potentially effected frequency, adjusting receiver processing when the indication from the first RAT radio to the second RAT radio to indicate that the first RAT radio is transmitting is received;

if the second RAT radio is not operating on a potentially effected frequency when the indication from the first RAT radio to the second RAT radio to indicate that the first RAT radio is transmitting is received, ignoring the indication.

2. The method of claim 1 wherein said determining is performed by the first RAT radio, the method further comprising:

the second RAT radio making a determination of whether or not a transmission from the first RAT radio is expected to cause interference to reception by the second RAT radio based on at least one interference criterion;

if it is determined by the second RAT radio that the transmission from the first RAT radio is not expected to cause interference to reception by the second RAT radio, ignoring the indication received from the first RAT radio.

3. The method of claim 1 wherein at least one interference criterion comprises at least one of:

first RAT output power;

first RAT transmission bandwidth;

frequency separation between first RAT frequency band and second RAT frequency band.

4. The method of claim 1 wherein at least one interference criterion comprises a requirement that the first RAT output power be greater than a threshold.

5. The method of claim 1 wherein at least one interference criterion comprises a requirement that the first RAT output power be greater than a threshold, wherein the threshold that is applied is varied as a function of transmission bandwidth.

6. The method of claim 1 wherein at least one interference criterion comprises a requirement that the first RAT output power be greater than a threshold, wherein the threshold is defined as a function of transmission bandwidth and frequency separation between a first RAT frequency band and a second RAT frequency band.

7. The method of claim 1 further comprising:

the second RAT radio generating an indication to the first RAT radio when an unacceptable level of interference is detected;

defining at least one criterion based on the indication generated by the second RAT radio.

8. The method of claim 1 further comprising:

the second RAT radio adjusting receiver processing when the indication from the first RAT radio to the second RAT radio to indicate that the first RAT radio is transmitting is received.

9. A method in a device comprising a first RAT radio and a second RAT radio, the method comprising:

determining whether or not a transmission from the first RAT is expected to cause interference to reception by the second RAT radio based on at least one interference criterion;

when it has been determined that the transmission from the first RAT radio is expected to cause interference to reception by the second RAT radio, transmitting an indication from the second RAT radio to the first RAT radio to indicate that the second RAT radio is receiving;

if the first RAT radio is operating on a potentially effected frequency, limiting transmit power when the indication from the second RAT radio to the first RAT radio to indicate that the second RAT radio is receiving is received;

if the first RAT radio is not operating on a potentially effected frequency when the indication from the second RAT radio to the first RAT radio to indicate that the second RAT radio is receiving is received, ignoring the indication.

10. The method of claim 9 wherein the at least one interference criterion comprises at least one of:
first RAT output power;
first RAT transmission bandwidth;
frequency separation between first RAT frequency band and second RAT frequency band.

11. The method of claim 9 wherein the at least one interference criterion comprises a requirement that the first RAT output power be greater than a threshold.

12. The method of claim 9 wherein the at least one interference criterion comprises a requirement that the first RAT output power be greater than a threshold, wherein the threshold that is applied is varied as a function of transmission bandwidth.

13. The method of claim 9 wherein at least one interference criterion comprises a requirement that the first RAT output power be greater than a threshold, wherein the threshold is defined as a function of transmission bandwidth and frequency separation between a first RAT frequency band and a second RAT frequency band.

14. The method of claim 9 further comprising:
the first RAT radio limiting transmit power when the indication from the second RAT radio to the first RAT radio to indicate that the second RAT radio is receiving is received.

15. The method of claim 9 wherein the first RAT radio is an LTE radio and the second RAT radio is a Wi-Fi radio or a Bluetooth radio.

16. A method in a device comprising a first RAT radio and a second RAT radio, the method comprising:
the second RAT radio receiving an indication from the first RAT radio indicating that the first RAT radio is transmitting;
the second RAT radio determining whether or not a transmission from the first RAT radio is expected to cause interference to the second RAT radio based on at least one interference criterion;
if it is determined that the transmission from the first RAT radio is not expected to cause interference to the second RAT radio, ignoring the indication.

17. The method of claim 16 further comprising:
if it is determined that the transmission from the first RAT radio is expected to cause interference to the second RAT radio, modifying receiver processing in the second RAT radio.

18. A communications device comprising:
a first RAT (radio access technology) radio;
a second RAT radio comprising:
a transmitter;
a first processor; and
a first interference determiner configured to determine whether or not a transmission from the first RAT radio is expected to cause interference to reception by the second RAT radio based on at least one interference criterion;
wherein the first processor is configured to transmit via the transmitter an indication from the first RAT radio to the second RAT radio to indicate that the first RAT radio is transmitting only when the first interference determiner has determined that the transmission from the first RAT radio is expected to cause interference to reception by the second RAT radio.

19. The communications device of claim 18 wherein the first RAT radio comprises said first interference determiner;
the second RAT radio further comprises a second processor and a second interference determiner configured to determine whether or not a transmission from the first RAT radio is expected to cause interference to reception by the second RAT radio based on at least one interference criterion;
wherein the second processor is configured to ignore the indication received from the first RAT radio when the second interference determiner determines that the transmission from the first RAT radio is not expected to cause interference to reception by the second RAT radio.

20. A communications device comprising:
a first RAT (radio access technology) radio;
a second RAT radio comprising:
a transmitter;
a processor; and
an interference determiner configured to determine whether or not a transmission from the first RAT is expected to cause interference to reception by the second RAT radio based on at least one interference criterion;
wherein the processor is configured to transmit via the transmitter an indication from the second RAT radio to the first RAT radio to indicate that the second RAT radio is receiving when the interference determiner has determined that the transmission from the first RAT radio is expected to cause interference to reception by the second RAT radio.

* * * * *

UNITED STATES PATENT AND TRADEMARK OFFICE
CERTIFICATE OF CORRECTION

| | |
|---|---|
| PATENT NO. | : 9,219,563 B2 |
| APPLICATION NO. | : 13/625411 |
| DATED | : December 22, 2015 |
| INVENTOR(S) | : Mohammed Nawaf Smadi et al. |

It is certified that error appears in the above-identified patent and that said Letters Patent is hereby corrected as shown below:

IN THE CLAIMS

In Column 16, Line 20, In Claim 18, after "transmitting" delete "only".

Signed and Sealed this
Third Day of May, 2016

Michelle K. Lee
*Director of the United States Patent and Trademark Office*